United States Patent
Matsuura et al.

(10) Patent No.: US 10,864,809 B2
(45) Date of Patent: Dec. 15, 2020

(54) ASSEMBLY STRUCTURE OF DOOR WEATHER STRIP

(71) Applicant: NISHIKAWA RUBBER CO., LTD., Hiroshima (JP)

(72) Inventors: Toshifumi Matsuura, Hatsukaichi (JP); Akiyoshi Kubota, Hiroshima (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 203 days.

(21) Appl. No.: 16/028,966

(22) Filed: Jul. 6, 2018

(65) Prior Publication Data

US 2019/0016202 A1 Jan. 17, 2019

(30) Foreign Application Priority Data

Jul. 13, 2017 (JP) ................................ 2017-137191

(51) Int. Cl.
| | |
|---|---|
| *B60J 10/76* | (2016.01) |
| *E06B 7/23* | (2006.01) |
| *B60J 10/86* | (2016.01) |
| *B60R 13/04* | (2006.01) |
| *B60J 10/265* | (2016.01) |
| *B60J 10/27* | (2016.01) |

(52) U.S. Cl.
CPC ............. *B60J 10/76* (2016.02); *B60J 10/265* (2016.02); *B60J 10/27* (2016.02); *B60J 10/86* (2016.02); *B60R 13/04* (2013.01); *E06B 7/2312* (2013.01)

(58) Field of Classification Search
CPC ... B60J 10/76; B60J 10/86; B60J 10/45; B60J 10/27; B60J 10/265; E06B 7/2312
See application file for complete search history.

(56) References Cited

U.S. PATENT DOCUMENTS

| | | | |
|---|---|---|---|
| 8,181,397 B2* | 5/2012 | Daio ........................ | B60J 10/74 49/475.1 |
| 2002/0108313 A1* | 8/2002 | Nozaki .................. | B60J 5/0402 49/441 |
| 2006/0162258 A1* | 7/2006 | Yamashita ............... | B60J 10/24 49/495.1 |

(Continued)

FOREIGN PATENT DOCUMENTS

| | | | | |
|---|---|---|---|---|
| DE | 102010039774 A1 * | 3/2012 | ............. | B60J 10/30 |
| EP | 1232887 A2 * | 8/2002 | ............. | B60J 10/24 |

(Continued)

*Primary Examiner* — Marcus Menezes
(74) *Attorney, Agent, or Firm* — Holtz, Holtz & Volek PC

(57) ABSTRACT

An assembly structure of a door weather strip includes a roll sash with a projection, a press sash without a projection and joined to the roll sash, a decorative molding which covers the sashes, and an end cap fit on the decorative molding. An outer seal lip of the door weather strip includes: an upper side protrusion and a lower side protrusion which extend outwardly toward an exterior of an automobile and are parallel with each other in a longitudinal direction; and a channel between the protrusions, which is open outwardly toward the exterior of the automobile. The protrusions are connected by a connecting wall on a front end of the channel, slid toward a front side of a door from a rear side, and guided into a space between the press sash and the end cap with a projection on the end cap guided into the channel.

6 Claims, 8 Drawing Sheets

(56) References Cited

U.S. PATENT DOCUMENTS

| | | | | |
|---|---|---|---|---|
| 2011/0204671 A1* | 8/2011 | Baratin | ................. | B60J 10/235 296/93 |
| 2011/0296763 A1* | 12/2011 | Lee | ......................... | B60J 10/87 49/493.1 |
| 2012/0274102 A1* | 11/2012 | Ertl | ......................... | B60J 10/88 296/201 |
| 2014/0007511 A1* | 1/2014 | Franzen | ................. | F16B 5/121 49/483.1 |
| 2014/0059940 A1* | 3/2014 | Eguchi | .................... | B60J 10/21 49/479.1 |
| 2015/0210149 A1* | 7/2015 | Saiki | ..................... | B60J 5/0404 296/152 |
| 2018/0298679 A1* | 10/2018 | Matsuura | ............... | B60J 10/265 |
| 2019/0118732 A1* | 4/2019 | Tomoyasu | ............... | B60J 10/16 |
| 2019/0193541 A1* | 6/2019 | Takeda | .................... | B60J 10/88 |

FOREIGN PATENT DOCUMENTS

| | | | | | |
|---|---|---|---|---|---|
| FR | 2957855 | A1 | * | 9/2011 | ............ B60J 10/235 |
| JP | 2005239113 | A | * | 9/2005 | ............ B60J 10/246 |
| JP | 4762964 | B2 | | 8/2011 | |
| JP | 5531111 | B2 | | 6/2014 | |

\* cited by examiner

Fig. 4
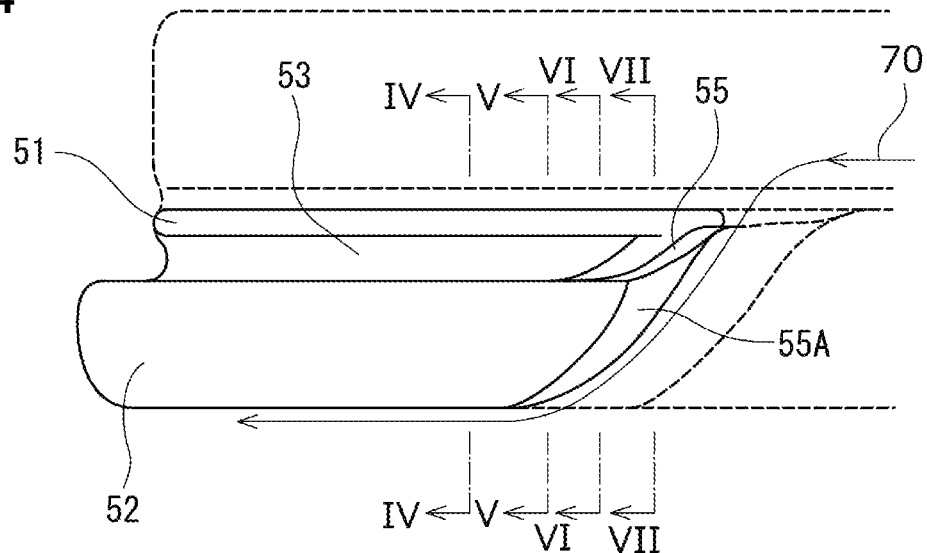
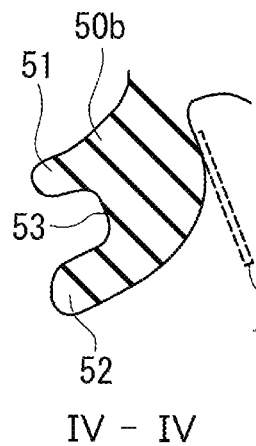
Fig. 5(a)
IV - IV
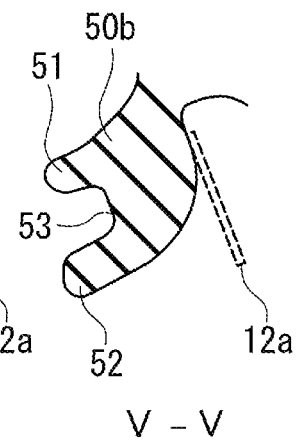
Fig. 5(b)
V - V
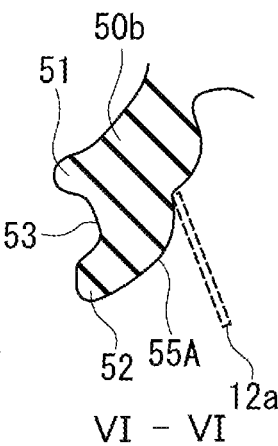
Fig. 5(c)
VI - VI
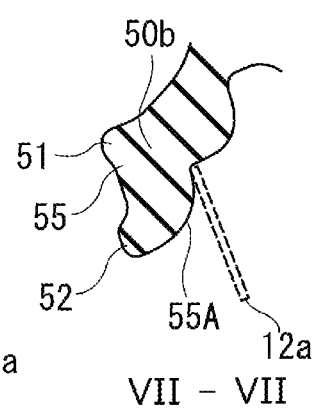
Fig. 5(d)
VII - VII

ASSEMBLY STRUCTURE OF DOOR WEATHER STRIP

CROSS REFERENCE TO RELATED APPLICATION

This application claims the benefit under 35 USC § 119 of JP Patent Application JP 2017-137191 filed Jul. 13, 2017, the entire disclosure of which is incorporated herein by reference.

BACKGROUND INFORMATION

The present invention relates to an assembly structure of a door weather strip. The assembly structure includes a roll sash and a press sash joined to each other to form an upper part of an automobile door sash, a decorative molding provided on the sashes, and an end cap fit on an end of the decorative molding.

FIG. 9 to FIG. 11 show a traditional door 1, including a roll sash 11, a press sash 12, a decorative molding 20, and an end cap 25. The roll sash 11 extends in a front and rear direction of the automobile. The press sash 12 extends in an upper and lower direction of the automobile and slightly extends in the front and rear direction of the automobile such that the press sash 12 is joined to the roll sash 11 by welding to form a corner of a door sash 10 on an upper periphery of a front door 1 of the automobile. The decorative molding 20 covers an upper end periphery 11a of the roll sash 11 and an upper end periphery 12a of the press sash 12 from an exterior of the automobile. The end cap 25 is fit on a rear end of the decorative molding 20.

A door weather strip 30 is configured to operably couple to an outer circumferential edge on an upper side (outer circumferential edge on a roof side) of the door 1. A hollow seal member 32 and an outer seal lip 33 of the door weather strip 30 make elastic contact with a door opening edge of an automobile body 2 when the door 1 is in a closed position.

The door weather strip 30 includes an extrusion molding part which extends along the roof side, the extrusion molding part which extends along a pillar side, and a die molded part configured to connect the extrusion molding parts. The die molded part is arranged on a rear corner of the door 1.

An installation base member 31 of the door weather strip 30 has a substantially plate-shape. As shown in FIG. 10, the installation base member 31 is arranged on a flat surface 11b of the roll sash 11. An outer-cabin side end 31a of the installation base member 31 is fit between a projection 11c on an inner-cabin side surface of the upper end periphery 11a of the roll sash 11 and the flat surface 11b. An inner-cabin side end 31b of the installation base member 31 is fit between an anchoring part 11d, which is vertically formed on an inner-cabin side of the flat surface 11b, and the flat surface 11b.

The door weather strip 30 also includes a rib-shaped protrusion 35 on an outer-cabin side between the installation base member 31 and the outer seal lip 33. The door weather strip 30 is configured to operably couple to the roll sash 11 by clasping the projection 11c of the roll sash 11 between the rib-shaped protrusion 35 and the outer-cabin side end 31a of the installation base member 31.

As shown in FIG. 11, the press sash 12 does not include a projection on an inner-cabin side surface. Accordingly, the installation base member 31 of the door weather strip 30 is arranged on a flat surface 12b of the press sash 12 and fixed by a clip not shown.

On an end of the press sash 12, that is a rear side of the door 1, as shown in FIG. 11, the end cap 25 covers up a space between the decorative molding 20 and the upper end periphery 12a of the press sash 12. The outer-cabin side end 31a of the installation base member 31 and an anchoring protrusion 36 of a die molded part of the door weather strip 30 fit with concave shaped openings 25a, 25b of the end cap 25, respectively. The anchoring protrusion 36 is on an upper side relative to the outer-cabin side end 31a and extends outwardly toward the exterior of the automobile from a base root of an outer seal lip 33.

On the rear corner of the door 1, the door weather strip 30 couples to the end cap 25 by pressing the door weather strip 30 against the end cap 25 outwardly toward an exterior of the automobile from an interior, and fitting the outer-cabin side end 31a of the installation base member 31 and the anchoring protrusion 36 with the concave shaped openings 25a, 25b of the end cap 25. The end cap 25 couples to the press sash 12. With this configuration, the door weather strip 30 may couple to the end cap 25 unstably.

More specifically, the installation base member 31 of the door weather strip 30 is arranged on the flat surface 12b of the press sash 12 and is partially fixed by a clip, not directly clasped by the press sash 12. Accordingly, the installation base member 31 is unstable on the press sash 12.

This configuration degrades sealing performance of the door weather strip 30 and allows entrance of water toward the interior of the automobile.

In this connection, Japanese Patent No. 5531111 and Japanese Patent No. 4762964 disclose an assembly structure of a hard garnish on the door weather strip which couples to the door sash by pressing the hard garnish against the door weather strip inwardly toward the interior of the automobile from the exterior. But Japanese patent No. 5531111 and Japanese patent No. 4762964 do not disclose a structure that includes the roll sash and the press sash joined to each other to form the upper part of the automobile door sash, and the end cap fit on the end of the decorative molding.

In addition, the door weather strip of Japanese patent No. 5531111 and Japanese patent No. 4762964 is configured to operably couple to the door sash prior to the hard garnish. This configuration complicates removal of the door weather strip.

Therefore, an object of the present invention is to provide the assembly structure that simplifies removal of the door weather strip from the door sash as well as stable and simple assembly of the door weather strip.

SUMMARY

In order to achieve the above-mentioned object, according to one aspect of the invention, an assembly structure of a door weather strip is provided. The assembly structure includes: a roll sash (11), a press sash (12), a decorative molding (20), an end cap (40), and a door weather strip (30). The roll sash (11) extends in a longitudinal direction. The roll sash (11) is roll-formed. The roll sash (11) includes a projection (11c) on an inner-cabin side surface of an upper end periphery (11a). The press sash (12) extends in the longitudinal direction. The press sash (12) is press-molded. The press sash (12) includes an upper end periphery (12a). The upper end periphery (12a) is free from a projection on an inner-cabin side surface. The press sash (12) is joined to the roll sash (11) to form an upper part of a door sash (10). The decorative molding (20) extends in the longitudinal direction. The decorative molding (20) is configured to cover the upper end periphery (11a) of the roll sash (11) and the upper end periphery (12a) of the press sash (12) from an exterior of the automobile. The end cap (40) is configured to fit on an end of the decorative molding (20).

The door weather strip (30) includes: a hollow seal member (32) configured to make elastic contact with a door opening edge of an automobile body (2); an outer seal lip (33) configured to make elastic contact with the door opening edge of the automobile body (2); and a die molded part configured to operably couple to the press sash (12) and the end cap (40).

The end cap (40) includes a projection (41) which extends inwardly toward an interior of the automobile and in the longitudinal direction.

The outer seal lip (33) of the door weather strip (30) includes: an upper side protrusion (51), a lower side protrusion (52), a channel (53), and a connecting wall (55). The upper side protrusion (51) and the lower side protrusion (52) extend outwardly toward the exterior of the automobile from an upper side position and a lower side position on the outer seal lip (33), respectively, and are parallel with each other in the longitudinal direction. The channel (53) is formed between the upper side protrusion (51) and the lower side protrusion (52). The channel (53) is open outwardly toward the exterior of the automobile. The channel (53) has a first end and a second end opposite to the first end in a front and rear direction of the channel (53). The connecting wall (55) is configured to connect the upper side protrusion (51) and the lower side protrusion (52) on the first end of the channel (53) and cover up the first end of the channel (53).

A first end in a front and rear direction of the upper side protrusion (51), a first end in a front and rear direction of the lower side protrusion (52), and the first end of the channel (53) are slid in the longitudinal direction along the decorative molding (20) toward an inside of a door from an outside of the door and guided into a space between the press sash (12) and the end cap (40). The projection (41) is guided into the channel (53). The door weather strip (30) is configured to operably couple to an outer circumferential edge on an upper side of the door sash (10).

In addition, according to an aspect of the present invention, the connecting wall (55) includes a slope (55A) which tapers and slopes toward the first end of the channel (53) and the exterior of the automobile.

In addition, according to an aspect of the present invention, the outer seal lip (33) includes a divergence (50) which extends outwardly toward the exterior of the automobile from an outer-cabin side surface of the outer seal lip (33). The divergence (50) includes the upper side protrusion (51), the lower side protrusion (52), and the channel (53) on an outer-cabin side surface.

In addition, according to an aspect of the present invention, the divergence (50) includes a base root (50a) and a thick part (50b). The base root (50a) is reduced in thickness. The base root (50a) extends outwardly toward the exterior of the automobile from the outer-cabin side surface of the outer seal lip (33). The thick part (50b) extends outwardly toward the exterior of the automobile from the base root (50a). The thick part (50b) includes the upper side protrusion (51), the lower side protrusion (52), and the channel (53) on an outer-cabin side surface.

Symbols in parentheses show constituents or items corresponding to the drawings and DETAILED DESCRIPTION.

According to the present invention, the first end in the front and rear direction of the upper side protrusion, the first end in the front and rear direction of the lower side protrusion, and the first end in the front and rear direction of the channel are slid in the longitudinal direction along the decorative molding toward the inside of the door from the outside of the door and guided into the space between the press sash and the end cap. While sliding the door weather strip, the projection on the end cap is guided into the channel. This configuration firmly supports the door weather strip from an inner-cabin and outer-cabin direction and stably fixes the door weather strip. In addition, as compared with the door weather strip of Japanese patent No. 5531111 and Japanese patent No. 4762964 configured to operably couple to the door sash prior to the hard garnish or the end cap, this configuration simplifies removal of the door weather strip after assembly and is improved in operability.

In addition, the connecting wall is configured to connect the upper side protrusion and the lower side protrusion on the channel and cover up a front end of the channel. The upper side protrusion, the lower side protrusion, and the channel are on an outer-cabin side of the outer seal lip and in the space between the press sash and the end cap. This configuration increases rigidity compared with a front end that is open.

As a result, the door weather strip is easily slid and guided into the space between the press sash and the end cap from the outside of the door. In other words, if the connecting wall does not connect the upper side protrusion and the lower side protrusion, the following unfavorable conditions may arise: the end cap catches at least one of the upper side protrusion and the lower side protrusion while sliding the door weather strip and the door weather strip is not slid; the press sash catches a base root of the upper side protrusion and the lower side protrusion and the door weather strip is not slid; the door weather strip that is not easy to slide increases time for assembly operation. The connecting wall, which connects the upper side protrusion and the lower side protrusion, prevents at least one of the protrusions from fluttering in the inner-cabin and outer-cabin direction, secures rigidity of the top end, and simplifies assembly.

The upper side protrusion and the lower side protrusion as well as the door weather strip include rubber-like elastic body. The upper side protrusion and the lower side protrusion including rubber-like elastic body are not too thick or too rigid to warp, or do not have rigidity in side surface directions. The upper side protrusion and the lower side protrusion warp or fall down even with a slight force in the side surface direction or in the longitudinal direction. It is true that the upper side protrusion and the lower side protrusion are formed on the divergence independent from the door weather strip, but each of the upper side protrusion and the lower side protrusion, connected by the connecting wall, is prevented from warping or falling down.

In addition, the connecting wall includes the slope which is a top end of the channel for insertion and which tapers and slopes toward a side of the top end of the channel and the exterior of the automobile. Accordingly, when sliding and guiding the door weather strip into the space between the press sash and the end cap from an outside of the door with the press sash in close contact with the slope, the slope guides the press sash toward the exterior of the automobile from the interior. This configuration simplifies insertion of the door weather strip.

In addition, the outer seal lip includes the divergence which extends outwardly toward the exterior of the automobile from the outer-cabin side surface of the outer seal lip, and the divergence includes the upper side protrusion, the lower side protrusion, and the channel on the outer-cabin side surface. This configuration enables to slide and move a part including the upper side protrusion, the lower side protrusion, and the channel easily and solo toward the inside of the door from the space between the press sash and the end cap.

In addition, the divergence includes the base root and the thick part. The base root is reduced in thickness and extends outwardly toward the exterior of the automobile from the outer-cabin side surface of the outer seal lip. The thick part extends outwardly toward the exterior of the automobile from the base root and includes the upper side protrusion, the lower side protrusion, and the channel on the outer-cabin side surface. This configuration stabilizes the divergence.

BRIEF DESCRIPTION OF THE DRAWINGS

FIG. 4 is an enlarged perspective view of an important part according to the embodiment of the present invention of the assembly structure of the door weather strip seen in a direction indicated by an arrow 100 in FIG. 1;

FIG. 5(a) to FIG. 5(d) are sectional views of FIG. 4, of which FIG. 5(a) is a sectional view taken along line IV-IV of FIG. 4; FIG. 5(b) is a sectional view taken along line V-V of FIG. 4; FIG. 5(c) is a sectional view taken along line VI-VI of FIG. 4; FIG. 5(d) is a sectional view taken along line VII-VII of FIG. 4;

DETAILED DESCRIPTION

Figure 1:
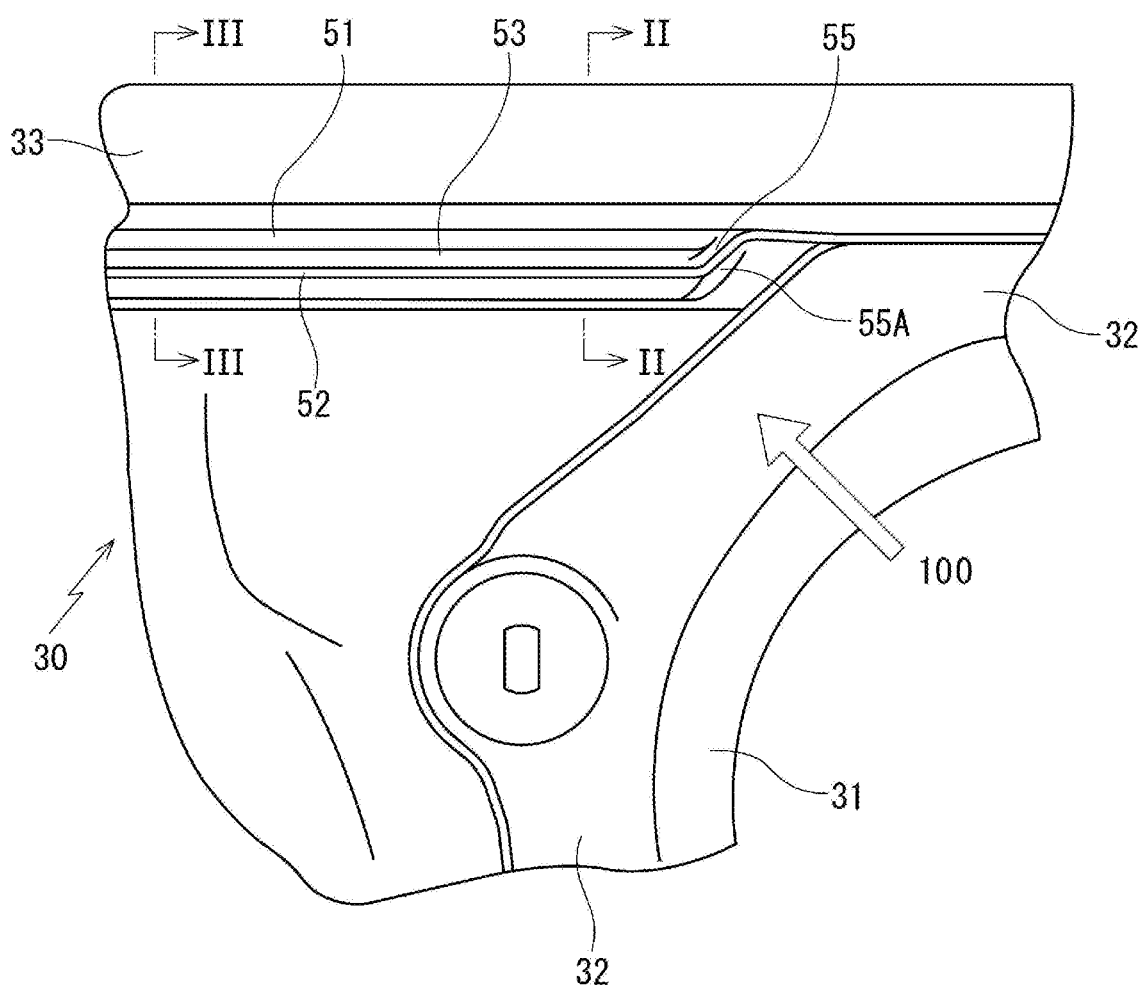
FIG. 1 is an enlarged perspective view of a die molded part according to an embodiment of the present invention of a door weather strip for use in an assembly structure of the door weather strip.

Referring to the drawings, an assembly structure according to an embodiment of the present invention of a door weather strip will be described using a front door of an automobile. When constituents or items correspond to those in prior arts, the same symbols are used. It is to be noted that words "front, rear, upper, lower" in the embodiment indicate front, rear, upper, lower positions of the automobile on a flat surface. An inside of a door indicates an inner side of the door relative to an outer circumferential frame as seen from a side surface of the door. An outside of the door indicates an outer side of the door relative to the outer circumferential frame as seen from the side surface of the door.

Figure 2:
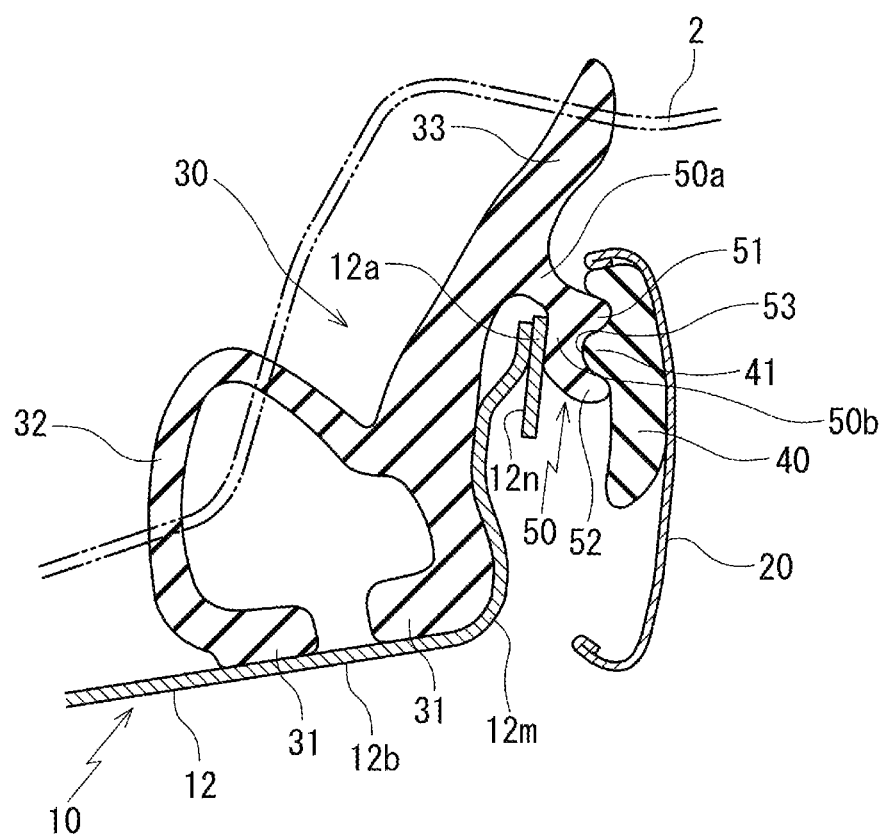
FIG. 2 is an enlarged sectional view of the assembly structure according to the embodiment of the present invention of the door weather strip taken along line II-II of FIG. 1.

The door weather strip according to the embodiment of the present invention is configured to operably couple to a door 1. The door 1 includes a roll sash 11 and a press sash 12. The roll sash 11 extends in a longitudinal direction (front and rear direction of the automobile when the door 1 is in a closed position) and is roll-formed. The press sash 12 is press-molded to extend upwardly from a door belt line and to turn slightly in the longitudinal direction in the same manner as the roll sash 11. The press sash 12 is joined to the roll sash 11 by welding to form an upper part of a door sash 10. In the same manner as a prior art shown in FIG. 10, the roll sash 11 includes a projection 11c on an inner-cabin side surface of an upper end periphery 11a. The projection 11c extends inwardly toward the interior of the automobile. As shown in FIG. 2, the press sash 12 is free from a projection, which extends inwardly toward the interior of the automobile, on an inner-cabin side surface of an upper end periphery 12a.

The upper end periphery 11a of the roll sash 11 is on an outer-cabin side of a flat surface 11b. An anchoring part 11d is vertically formed on an inner-cabin side of the flat surface 11b. The flat surface 11b extends in the longitudinal direction and is wide in an inner-cabin and outer-cabin direction.

The upper end periphery 12a of the press sash 12 is vertically formed on an outer-cabin side of the flat surface 12b. The flat surface 12b extends in the longitudinal direction and is wide in the inner-cabin and outer-cabin direction.

A decorative molding 20 extends in the longitudinal direction and is configured to cover the upper end periphery 11a of the roll sash 11 and the upper end periphery 12a of the press sash 12 from an exterior of the automobile.

Examples of the decorative molding 20 include "optical moldings". An outer-cabin side surface of the optical molding is colored silver and is mirror-finished to give a sense of luxury to the automobile.

Figure 3:
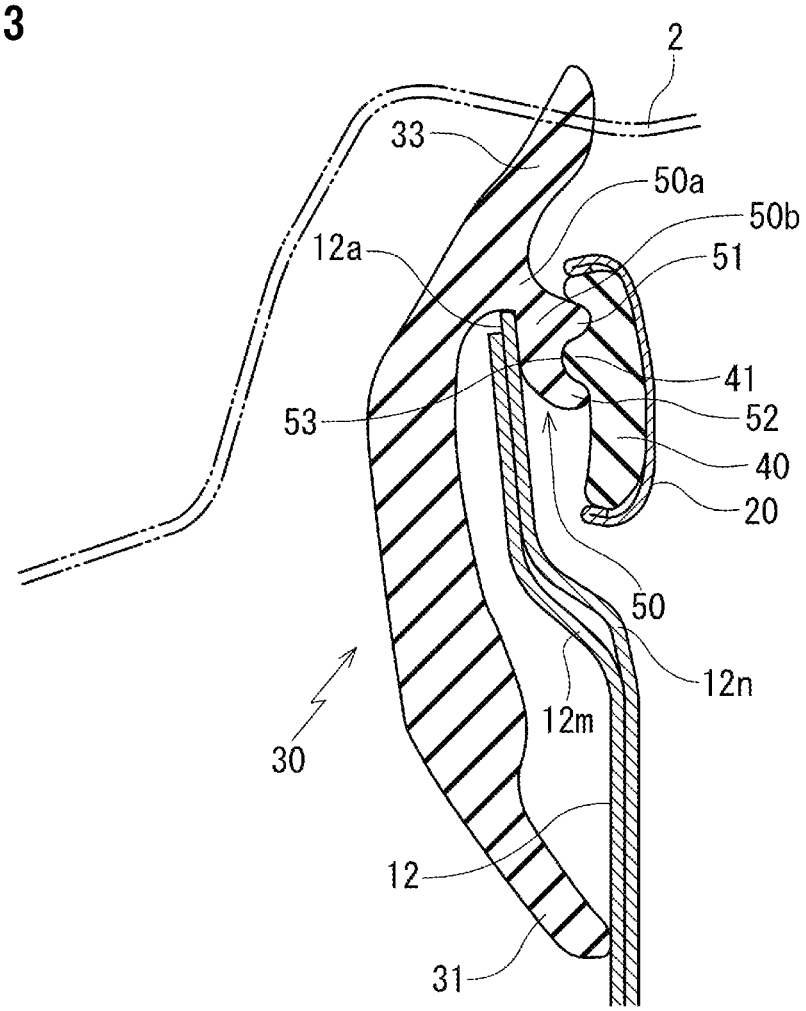
FIG. 3 is an enlarged sectional view of the assembly structure according to the embodiment of the present invention of the door weather strip taken along line III-III of FIG. 1.
Figure 11:
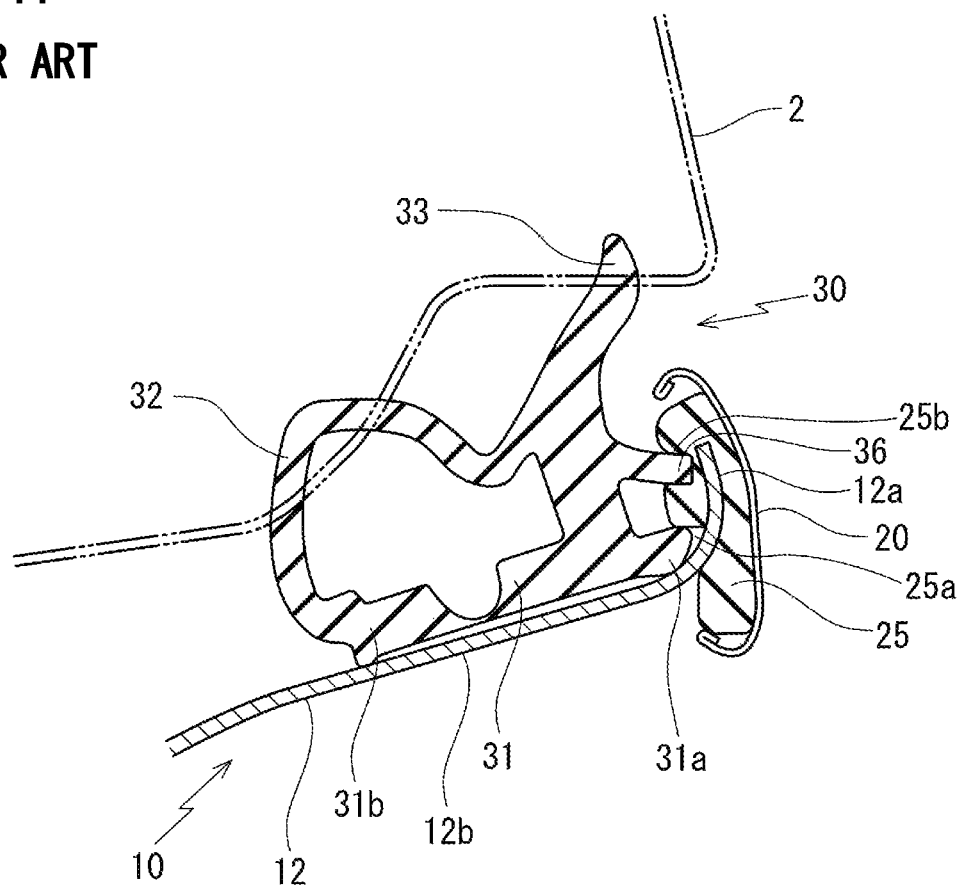
FIG. 11 is the enlarged sectional view of the assembly structure according to the prior art of the door weather strip taken along line XI-XI of FIG. 9.

On an end part of the press sash 12, that is a rear side of the door 1, as shown in FIG. 2 and FIG. 3, an end cap 40 is fit on an end part on a rear side of the decorative molding 20 from the outside of the door 1. The end cap 40 is fit on an inner-cabin side of the decorative molding 20 and at an interval from an upper end periphery 12a of the press sash 12 which faces the end cap 40. While in this embodiment the upper end periphery 12a of the press sash 12 includes an inner plate 12m and an outer plate 12n which are piled, this should not be construed in a limiting sense. On a part closest to the outside of the door 1 as shown in FIG. 3, the inner plate 12m and the outer plate 12n overlap each other over a wider area than at least one other part. On a part closer to the inside of the door 1 than FIG. 3, the outer plate 12n of the press sash 12 gradually narrows, and on a part as shown in FIG. 2 (line II-II of FIG. 1), the inner plate 12m and the outer plate 12n overlap each other over a narrower area. Another possible embodiment is that the press sash 12 is a singular plate as in a prior art (FIG. 11).

A weather strip 30 includes: an installation base member 31, configured to operably couple to an outer circumferential edge on an upper side (outer circumferential edge on a roof side) of the door sash 10; a hollow seal member 32, which is integrally molded with the installation base member 31 and functions as a main seal; and an outer seal lip 33, which is integrally molded with the installation base member 31 and functions as a sub seal. The door weather strip 30 includes an extrusion-molded part that is connected by die molding on a corner. On the press sash 12 as well as where the press sash 12 is joined to the roll sash 11, a die molded part of the door weather strip 30 is arranged.

Figure 10:
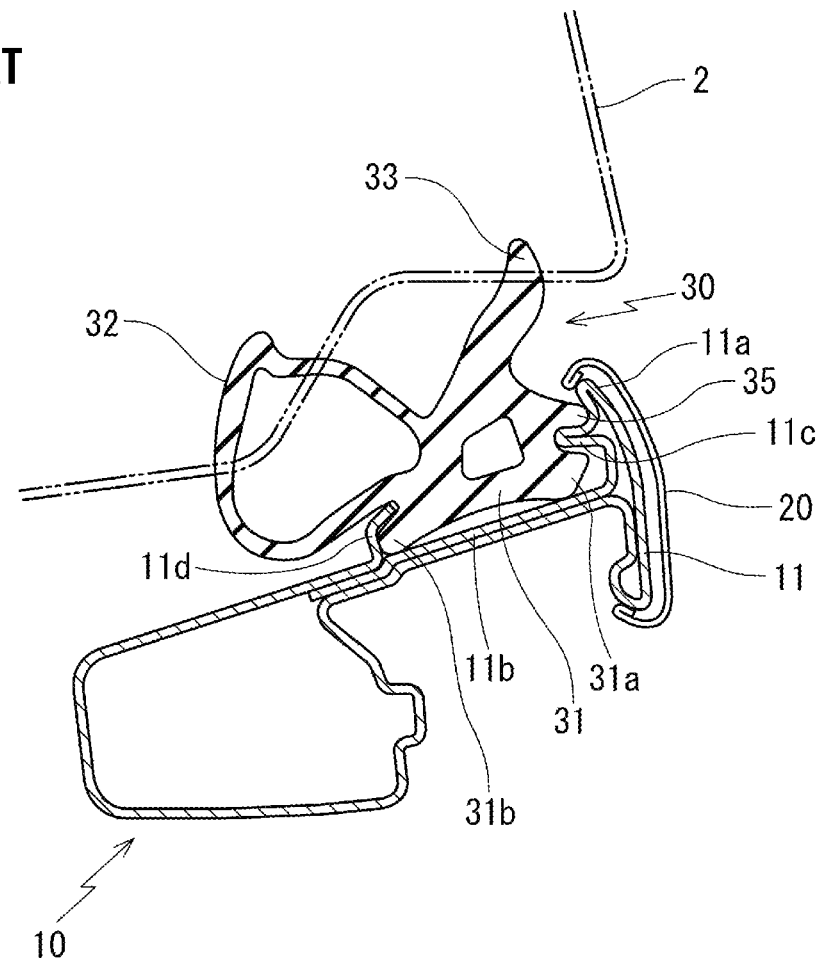
FIG. 10 is an enlarged sectional view of an assembly structure according to a prior art of a door weather strip taken along line X-X of FIG. 9.

The installation base member 31 substantially has a plate shape. As shown in FIG. 10, the installation base member 31 is arranged on the flat surface 11$b$ of the roll sash 11. An outer-cabin side end 31$a$ of the installation base member 31 is fit between the projection 11$c$ on the inner-cabin side surface of the upper end periphery 11$a$ of the roll sash 11 and the flat surface 11$b$. An inner-cabin side end 31$b$ of the installation base member 31 is fit between an anchoring part 11$d$, which is vertically formed on an inner-cabin side of the flat surface 11$b$, and the flat surface 11$b$.

As shown in FIG. 2 (line II-II in FIG. 1), the installation base member 31 is arranged on a flat surface 12$b$ of the press sash 12. The installation base member 31 of the door weather strip 30 is fixed on the flat surface 12$b$ of the press sash 12 by a clip (not shown). Another possible embodiment is that the installation base member 31 is fixed on the press sash 12 by double-sided tape instead of the clip or by the double-sided tape as well as the clip. As shown in FIG. 3 (line III-III in FIG. 1), the door weather strip on the part closest to the outside of the door 1 has a shape of a fin and the installation base member 31 is pressed against the inner plate 12$m$ of the press sash 12.

The hollow seal member 32 and the outer seal lip 33 are adjacent to each other. The hollow seal member 32 is integrally molded with an inner-cabin side of the installation base member 31 and the outer seal lip 33 is integrally molded with an outer-cabin side of the installation base member 31. A top end of the outer seal lip 33 substantially has a tongue-shaped cross section and extends in an outer circumferential direction of the door 1 and outwardly toward the exterior of the automobile.

As the end cap 40 is fit on the end part of the press sash 12, as shown in FIG. 1 to FIG. 3, an upper side protrusion 51, a lower side protrusion 52, and a channel 53 between the upper side protrusion 51 and the lower side protrusion 52 are guided into a space between the upper end periphery 12$a$ of the press sash 12 and the end cap 40. The upper side protrusion 51, the lower side protrusion 52, and the channel 53 are on an outer-cabin side of a die molded part of the door weather strip 30.

The upper side protrusion 51 and the lower side protrusion 52 are on an outer-cabin side surface of a divergence 50 which extends outwardly toward the exterior of the automobile from an outer-cabin side surface of the outer seal lip 33. The upper side protrusion 51 and the lower side protrusion 52 extend outwardly toward an upper side and a lower side of the outer-cabin side surface of the divergence 50, and are parallel with each other in the longitudinal direction. A channel 53 is formed between the upper side protrusion 51 and the lower side protrusion 52 and is open outwardly toward the exterior of the automobile.

The divergence 50 includes a base root 50$a$ and a thick part 50$b$. The base root 50$a$ is reduced in thickness and extends outwardly toward the exterior of the automobile from the outer-cabin side surface of the outer seal lip 33. The thick part 50$b$ extends outwardly toward the exterior of the automobile from the base root 50$a$. The thick part 50$b$ includes the upper side protrusion 51, the lower side protrusion 52, and the channel 53 on an outer-cabin side surface of the thick part 50$b$.

As shown in FIG. 1 and as shown in FIG. 4 which illustrates an important part of the present invention as seen from a lower side, a connecting wall 55 connects a first end in a front and rear direction of the upper side protrusion 51 and a first end in the front and rear direction of the lower side protrusion 52. In the present embodiment, the first end is a front end (side of a front part of the automobile in FIG. 1). In other words, the connecting wall 55 is configured to connect the upper side protrusion 51 and the lower side protrusion 52 on the front end of the channel 53. This configuration covers up the front end of the channel 53.

The connecting wall 55 may bridge a gap between the upper side protrusion 51 and the lower side protrusion 52 without covering up the channel 53. In the present embodiment, as shown in FIG. 5($d$) which is a sectional view taken along line VII-VII of FIG. 4, the connecting wall 55 covers up the channel 53 as well as connects the upper side protrusion 51 and the lower side protrusion 52 from top ends of the protrusions 51, 52 to base roots of the protrusions 51, 52.

The connecting wall 55 includes a slope 55A which tapers and slopes toward the front end of the channel 53 and the exterior of the automobile. In other words, as shown in FIG. 4, the slope 55A of the connecting wall 55 gradually tapers and slopes toward the front end of the channel 53, that is toward the inside of the door 1 from the outside of the door 1. In addition, as gradually shown in the order of FIG. 5($a$), FIG. 5($b$), FIG. 5($c$), and FIG. 5($d$), as the slope 55A of the connecting wall 55 approaches the inside of the door 1, the slope 55A slopes steeply toward the exterior of the automobile from the interior and tapers such that the thick part 50$b$ of the divergence 50 is reduced in thickness.

The end cap 40 includes a projection 41 on an inner-cabin side surface. The projection 41 extends inwardly toward the interior of the automobile and in the longitudinal direction. The projection 41 is shaped to fit the channel 53 without an opening. A top end of the end cap 40 is tapered. Accordingly, on the part closest to the outside of the door 1 as shown in FIG. 3, the end cap 40 is sandwiched between an upper side and a lower side of the decorative molding 20 and is held. On the part closer to the inside of the door 1, the decorative molding 20 is spaced from a lower end of the end cap 40. FIG. 2 shows that the decorative molding 20 does not hold the lower part of the end cap 40.

In order to couple the above-structured door weather strip 30 to the outer circumferential edge on the upper side of the door sash 10, the divergence 50 which extends form the outer seal lip 33 is slid toward the inside of the door 1 from the outside of the door 1. Also, the divergence 50 is guided into the space between the press sash 12 and the end cap 40.

With this configuration, the upper side protrusion 51, the lower side protrusion 52, and the channel 53 on the outer-cabin side of the divergence 50 are slid in the longitudinal direction along the decorative molding 20 toward the inside of the door 1 from the outside of the door 1, and are guided into the space between the press sash 12 and the end cap 40. While sliding the door weather strip 30, the projection 41 on the end cap 40 is guided into the channel 53 such that the projection 41 is sandwiched between the upper side protrusion 51 and the lower side protrusion 52.

In the present embodiment, the door weather strip 30 is slid with the inner-cabin side surface of the thick part 50$b$ of the divergence 50 in close contact with the outer-cabin side surface of the upper end periphery 12$a$ of the press sash 12.

While the door weather strip 30 is slid from the outside of the door 1 and guided into the space, the end cap 40 or the press sash 12 may catch the front end (top end for insertion) of the divergence 50. The connecting wall 55 connects the front end of the upper side protrusion 51 and the front end of the lower side protrusion 52 on the outer-cabin side of the divergence 50 and covers up the front end of the channel 53.

This configuration secures rigidity of the top end of the divergence 50 and simplifies insertion of the door weather strip 30.

Figure 6:
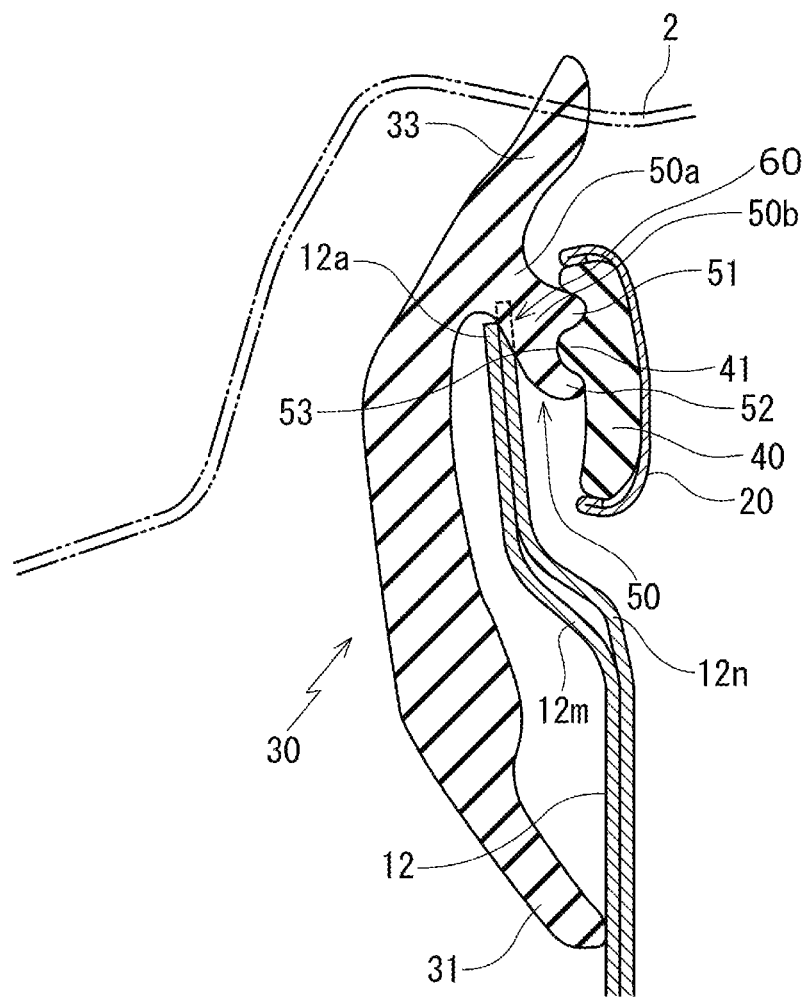
FIG. 6 is an enlarged sectional view of the assembly structure according to the embodiment of the present invention of the door weather strip of FIG. 3, which is taken along line III-III of FIG. 1, with a press sash catching a divergence.

Examples of the conditions that complicate the insertion include that the end cap 40 directly catches the upper side protrusion 51 or the lower side protrusion 52, not connected by the connecting wall 55, on the front side of the divergence 50 for insertion. Also, as indicated by an arrow 60 in FIG. 6, on the part closest to the outside of the door 1, as the door weather strip 30 is piled on a structure of an insertion slot between the press sash 12 and the end cap 40, the upper end periphery 12a of the press sash 12 catches the thick part 50b of the divergence 50. This configuration firmly fixes the divergence 50 as assembled but complicates the insertion of the divergence 50. More specifically, this configuration may shift the upper side protrusion 51 or the lower side protrusion 52 to touch the end cap 40, stop the insertion, complicate the insertion and increase time for assembly operation. The connecting wall 55, which connects the upper side protrusion 51 and the lower side protrusion 52, prevents at least one of the protrusions without rigidity from fluttering, that is warping or falling down unintentionally, in the inner-cabin and outer-cabin direction, and simplifies assembly.

In addition, the connecting wall 55 includes the slope 55A which tapers and slopes toward the front end (top end for insertion) of the channel 53 and the exterior of the automobile. Accordingly, when the door weather strip 30 is slid from the outside of the door 1 and guided into the space between the press sash 12 and the end cap 40 with the upper end periphery 12a of the press sash 12 in close contact with the slope 55A, as indicated by an arrow 70 in FIG. 4, the slope 55A automatically guides the upper end periphery 12a of the press sash 12 toward the interior of the automobile from the exterior. In other words, as the slope 55A comes into contact with the upper end periphery 12a of the press sash 12, the thick part 50b of the divergence 50 is guided into the space between the press sash 12 and the end cap 40. This configuration prevents the press sash 12 from catching the front side of the divergence 50, eliminates the need for transformation of the door weather strip 30 at the time of insertion, and further simplifies assembly.

As the door weather strip 30 couples to the door sash 10, on the press sash 12 especially, the upper end periphery 12a of the press sash 12 and the end cap 40 sandwich and firmly supports the divergence 50 from the inner-cabin and outer-cabin direction. The divergence 50 extends from the outer seal lip 33 of door weather strip 30. Accordingly, even in case the press sash 12 does not include an anchoring part and a clip partially fixes the installation base member 31 on the door sash 10, the door weather strip 30 is stably fixed on the door sash 10.

Figure 7:
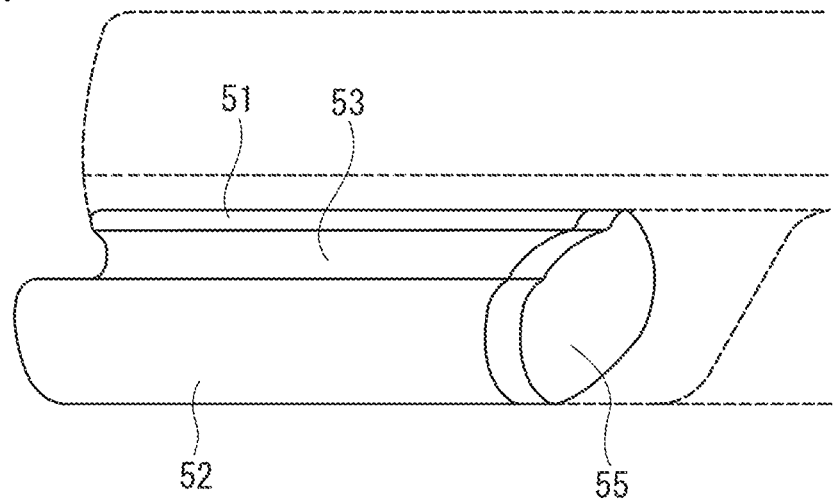
FIG. 7 is an enlarged perspective view of an important part according to the embodiment of the present invention of the assembly structure of another door weather strip seen in the direction indicated by the arrow 100 in FIG. 1.

In the present embodiment, when sliding the door weather strip 30 from the outside of the door 1 and guiding the door weather strip 30 into the space between the press sash 12 and the end cap 40, the slope 55A as the guide on the connecting wall 55 guides the upper end periphery 12a of the press sash 12 toward the interior of the automobile from the exterior. The connecting wall 55 connects the upper side protrusion 51 and the lower side protrusion 52. Another possible embodiment is, as shown in FIG. 7, the connecting wall 55 only connects the front ends of the upper side protrusion 51 and the lower side protrusion 52 without the slope for use as the guide.

More specifically, the connecting wall 55, which connects the front ends of the upper side protrusion 51 and the lower side protrusion 52, increases rigidity on the front end (top end for insertion) of the divergence 50. The divergence 50 extends from the outer-cabin side surface of the outer seal lip 33. Also, the connecting wall 55 controls fluttering of the upper side protrusion 51 and the lower side protrusion 52 in the inner-cabin and outer-cabin direction on the front ends of the protrusions 51, 52. This configuration simplifies the assembly operation.

Figure 8:
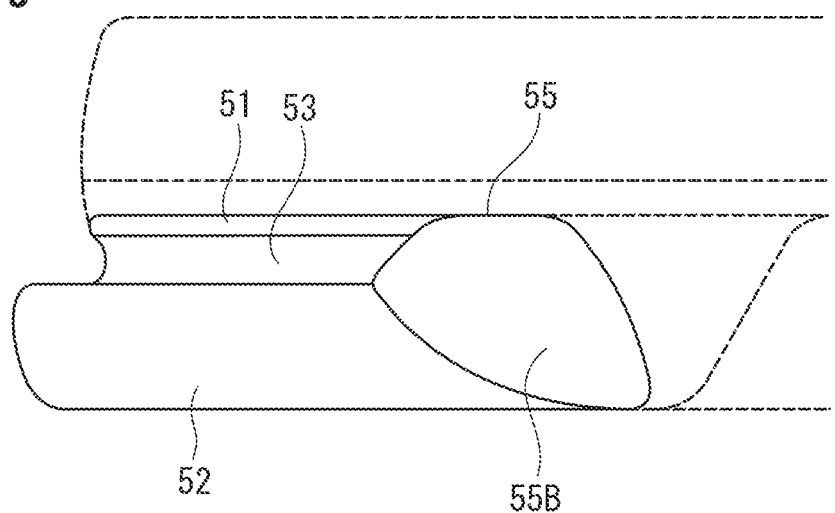
FIG. 8 is an enlarged perspective view of an important part according to the embodiment of the present invention of the assembly structure of still another door weather strip seen in the direction indicated by the arrow 100 in FIG. 1.
Figure 9:
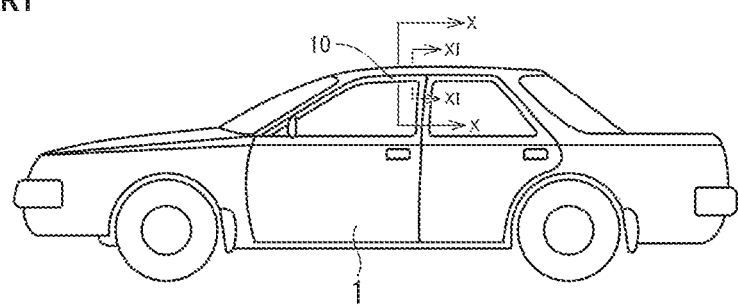
FIG. 9 is an external side view of an automobile.

Another possible embodiment is, as shown in FIG. 8, the connecting wall 55 includes a slope 55B which tapers toward a side opposite to the slope 55A relative to the connecting wall 55. The slope 55B tapers toward the front end of the channel 53 and tapers and slopes toward the interior of the automobile from the exterior.

With this configuration, when sliding the door weather strip 30 from the outside of the door 1 and guiding the door weather strip 30 into the space between the press sash 12 and the end cap 40 with the slope 55B in close contact with the projection 41 on the end cap 40, the projection 41 slips on the slope 50B and falls into the channel 53 such that the projection 41 fits with the channel 53.

While in this embodiment the door 1 is a front door, the present invention is also applicable to a rear door.

We claim:

1. An assembly structure of a door weather strip for a door of an automobile, the assembly structure comprising:
   a roll sash which extends in a longitudinal direction, the roll sash being roll-formed, and the roll sash including a projection on an inner-cabin side surface of an upper end periphery thereof;
   a press sash which extends in the longitudinal direction, the press sash being press-molded, the press sash including an upper end periphery, the upper end periphery being free from a projection on an inner-cabin side surface thereof, and the press sash being joined to the roll sash to form an upper part of a door sash;
   a decorative molding which extends in the longitudinal direction, the decorative molding configured to cover the upper end periphery of the roll sash and the upper end periphery of the press sash from an exterior of the automobile;
   an end cap configured to fit on an end of the decorative molding, the end cap including a projection which extends inwardly toward an interior of the automobile and in the longitudinal direction; and
   a door weather strip configured to operably couple to an outer circumferential edge on an upper side of the door sash, the door weather strip including a hollow seal member configured to make elastic contact with a door opening edge of a body of the automobile, and an outer seal lip configured to make elastic contact with the door opening edge of the body of the automobile,
   wherein part of the door weather strip is die-molded and configured to operably couple to the press sash and the end cap,
   wherein the outer seal lip of the door weather strip comprises:
      an upper side protrusion and a lower side protrusion which extend outwardly toward the exterior of the automobile from an upper side position and a lower side position on the outer seal lip, respectively, the upper side protrusion and the lower side protrusion being parallel with each other in the longitudinal direction;
      a channel between the upper side protrusion and the lower side protrusion, the channel being open outwardly toward the exterior of the automobile; and a connecting wall configured to connect the upper side protrusion and the lower side protrusion on a first end in a front and rear direction of the channel, the connecting wall covering up the first end of the channel, and wherein a first end in a front and rear direction of the upper side protrusion, a first end in a front and rear direction of the lower side protrusion, and the first end of the channel are configured to be slid in the longitudinal direction along the decorative molding toward an inside of the door from an outside of the door and guided into a space between the press sash and the end cap, the projection on the end cap being guided into the channel, during coupling of the door weather strip to the outer circumferential edge on the upper side of the door sash.

2. The assembly structure of the door weather strip as claimed in claim 1, wherein the connecting wall includes a slope which tapers and slopes toward the first end of the channel and the exterior of the automobile.

3. The assembly structure of the door weather strip as claimed in claim 1, wherein the upper side protrusion, the lower side protrusion, and the channel are on an outer-cabin side surface of a divergence, the divergence extending outwardly toward the exterior of the automobile from an outer-cabin side surface of the outer seal lip.

4. The assembly structure of the door weather strip as claimed in claim 3, wherein the divergence includes a base root and a thick part, the base root being reduced in thickness with respect to the thick part, the base root extending outwardly toward the exterior of the automobile from the outer-cabin side surface of the outer seal lip, the thick part extending outwardly toward the exterior of the automobile from the base root, and the upper side protrusion, the lower side protrusion, and the channel being on an outer-cabin side surface of the thick part.

5. The assembly structure of the door weather strip as claimed in claim 2, wherein the upper side protrusion, the lower side protrusion, and the channel are on an outer-cabin side surface of a divergence, the divergence extending outwardly toward the exterior of the automobile from an outer-cabin side surface of the outer seal lip.

6. The assembly structure of the door weather strip as claimed in claim 5, wherein the divergence includes a base root and a thick part, the base root being reduced in thickness with respect to the thick part, the base root extending outwardly toward the exterior of the automobile from the outer-cabin side surface of the outer seal lip, the thick part extending outwardly toward the exterior of the automobile from the base root, and the upper side protrusion, the lower side protrusion, and the channel being on an outer-cabin side surface of the thick part.

* * * * *